(12) United States Patent
Krishna et al.

(10) Patent No.: US 12,302,027 B2
(45) Date of Patent: May 13, 2025

(54) SYSTEMS AND METHODS FOR MASKING ENDOSCOPIC IMAGES

(71) Applicant: Stryker Corporation, Kalamazoo, MI (US)

(72) Inventors: Kundan Krishna, Surrey (CA); Amit A. Mahadik, San Jose, CA (US)

(73) Assignee: Stryker Corporation, Portage, MI (US)

( * ) Notice: Subject to any disclaimer, the term of this patent is extended or adjusted under 35 U.S.C. 154(b) by 113 days.

(21) Appl. No.: 18/147,683

(22) Filed: Dec. 28, 2022

(65) Prior Publication Data

US 2023/0209008 A1 Jun. 29, 2023

Related U.S. Application Data

(60) Provisional application No. 63/294,824, filed on Dec. 29, 2021.

(51) Int. Cl.
*H04N 5/262* (2006.01)
*H04N 23/63* (2023.01)

(52) U.S. Cl.
CPC ......... *H04N 5/2628* (2013.01); *H04N 23/635* (2023.01)

(58) Field of Classification Search
CPC .... H04N 5/2628; H04N 23/635; H04N 23/64; H04N 23/555
See application file for complete search history.

(56) References Cited

U.S. PATENT DOCUMENTS

2021/0114223 A1* 4/2021 Wee .................. H04N 23/54
2021/0232880 A1* 7/2021 Amir ................. H04N 1/6016

\* cited by examiner

*Primary Examiner* — Yogesh K Aggarwal
(74) *Attorney, Agent, or Firm* — Morrison & Foerster LLP

(57) ABSTRACT

Systems, methods, and computer readable storage medium techniques for masking endoscopic images are disclosed. A system receives an input digital image and applies one or more denoising algorithms and one or more contour detection algorithms to detect a plurality of contours in the image. A contour having the largest area is identified. A smallest circular area enclosing the largest area contour is estimated, and a mask is applied to the image based on the circular area to generate a masked image.

23 Claims, 5 Drawing Sheets
(2 of 5 Drawing Sheet(s) Filed in Color)

Contour with largest area

Image contours

Original image masked image

Minimum size circular area containing largest contour

Original image

Image contours

Contour with largest area

Minimum size circular area containing largest contour masked image masked image with zoom-in

SYSTEMS AND METHODS FOR MASKING ENDOSCOPIC IMAGES

CROSS-REFERENCE TO RELATED APPLICATIONS

This application claims the benefit of U.S. Provisional Application No. 63/294,824, filed Dec. 29, 2021, the entire contents of which are hereby incorporated by reference herein.

FIELD

This disclosure relates generally to image processing, and more specifically to systems and methods for masking surgical images captured through an endoscope.

BACKGROUND

Endoscopic imaging is critical to many modern surgical techniques, enabling surgeons to view close-up images of surgical sites. Images produced by endoscopes can be utilized during surgery or, additionally or alternatively, can be stored and processed at a later time. Processing of endoscopic images may include applying one or more masking operations to said endoscopic images, for example by applying a mask to inactive areas of the image if the active image area captured by the endoscope is smaller than the total amount of pixels available.

SUMMARY

Image processing may be used on images captured during endoscopic surgical procedures. For many procedure types, endoscopes produce images with an active image area that has a smaller dimension than the total amount of pixels available, creating inactive image areas. Transmitting, visualizing, storing, and/or processing an entire endoscopic image, including inactive image areas, creates an unnecessary burden on computational resources, leading to expense and inefficiencies. Accordingly, there is a need for methods for efficiently and effectively identifying active image areas from endoscopic image data in order to apply a masking operation to the image data, thereby generating a masked image such that the masked image may be more efficiently transmitted, visualized, stored, subject to additional image processing, and/or used in one or more determinations for an automated control system for a medical device.

While certain computer-vision-based algorithmic methods are known for generating image masks, the accuracy and efficiency of known methods is poor. Accordingly, there is a need for improved methods for efficiently and effectively generating and applying image masks to surgical endoscopic images, including by differentiating active and inactive image areas and masking inactive areas.

Disclosed herein are systems and methods for masking endoscopic images, wherein the disclosed system and methods may address one or more of the above-identified needs. An image processing system may be configured to generate and apply image masks to endoscopic images in order to mask portions of the images, as described herein. The system may receive an input digital image from an internal database, external database, image capture device, or other data storage medium. (The received image may be received as a frame in a video feed, and the techniques disclosed herein may be applied on a frame-by-frame basis, e.g., in real time, to the video feed.) A denoising algorithm may be applied to the received image to suppress noise contamination in the image. One or more contour detection algorithms may then applied to the image to detect a plurality of contours in the image, and the detected contour with the largest area may be identified. The system may estimate a circular area that encloses the largest detected contour, and a mask may be applied to the image such that only the portions of the image falling within the circular area are retained. The masked image may be stored, transmitted, visualized, displayed, and/or used to trigger an automated action by a system, such as an automated action by a medical device or a surgical system.

Use of the systems, methods, and techniques described herein may lead to less resource consumption when further processing is applied to the masked image rather than being applied to the entire original image. Optionally, one or more additional image processing techniques may be applied to the image after masking. For example, a marginal distance between an edge of the masked image and an edge of the input image may be determined, and, if the marginal distance is greater than a predetermined minimum distance, a zoom-in operation may be applied to the masked image to fill in the marginal inactive space. Optionally, a centering operation or a localized focus operation may be applied to the masked image.

In some aspects, a system for masking endoscopic images is provided, the system comprising one or more processors configured to: receive an input digital image; apply one or more contour detection algorithms to the digital image to detect a plurality of contours in the digital image; identify, among the plurality of contours, a contour having the largest area; estimate a circular area of the image enclosing the contour; and generate a masked digital image by applying a mask to the input digital image, wherein the mask is based on the estimated circular area.

Optionally, the one or more processors are configured to apply one or more denoising algorithms to the input digital image before applying the one or more contour detections.

Optionally, the circular area is a smallest circular area enclosing the contour.

Optionally, the circular area is a smallest circular area enclosing the combination of the contour and a circular area margin of a predetermined circular area margin size.

The predetermined circular area margin size may be set in accordance with a user input.

Optionally, one or more of the contour detection algorithms is a color-channel-specific contour detection algorithm.

Optionally, the one or more processors are configured to perform one or more image processing techniques on the masked digital image. The one or more image processing techniques can include one or more selected from: a zoom operation, a centering operation, and a localized focus operation.

Optionally, the one or more processors are configured to: determine a marginal distance between an edge of the masked image and an edge of the input image; determine whether the marginal distance is greater than a predetermined minimum distance; and in accordance with a determination that the marginal distance is greater than the predetermined minimum distance, apply a zoom-in operation to the masked image.

Optionally, the input digital image is a frame in an input image sequence.

Optionally, the masked digital image is a frame in an output image sequence.

In some aspects, a non-transitory computer-readable storage medium storing instructions for masking endoscopic images, or a computer program product including instructions for masking endoscopic images, is provided, the instructions configured to be executed by one or more processors of a system to cause the system to: receive an input digital image; apply one or more contour detection algorithms to the digital image to detect a plurality of contours in the digital image; identify, among the plurality of contours, a contour having the largest area; estimate a circular area of the image enclosing the contour; and generate a masked digital image by applying a mask to the input digital image, wherein the mask is based on the estimated circular area.

In some aspects, a method for masking endoscopic images is provided, the method configured to be performed by a system comprising one or more processors, the method comprising: receiving an input digital image; applying one or more contour detection algorithms to the digital image to detect a plurality of contours in the digital image; identifying, among the plurality of contours, a contour having the largest area; estimating a circular area of the image enclosing the contour; and generating a masked digital image by applying a mask to the input digital image, wherein the mask is based on the estimated circular area.

Optionally, the method may include applying one or more denoising algorithms to the input digital image before applying the one or more contour detections.

Optionally, the circular area is a smallest circular area enclosing the contour.

Optionally, the circular area is a smallest circular area enclosing the combination of the contour and a circular area margin of a predetermined circular area margin size.

Optionally, the predetermined circular area margin size is set in accordance with a user input.

Optionally, one or more of the contour detection algorithms is a color-channel-specific contour detection algorithm.

Optionally, the method may include performing one or more image processing techniques on the masked digital image.

Optionally, the one or more image processing techniques include one or more selected from: a zoom operation, a centering operation, and a localized focus operation.

Optionally, the method may include: determining a marginal distance between an edge of the masked image and an edge of the input image; determining that the marginal distance is greater than a predetermined minimum distance; and in accordance with determining that the marginal distance is greater than the predetermined minimum distance, applying a zoom-in operation to the masked image.

Optionally, the input digital image is a frame in an input image sequence.

Optionally, the masked digital image is a frame in an output image sequence.

The method may include receiving the input digital image from an internal database, external database, image capture device, or other data storage medium. The image capture device can be an endoscope. The endoscope may be pre-inserted into a body lumen. The method for masking endoscopic images can exclude the step of inserting the endoscope into a body lumen.

It will be appreciated that any of the variations, aspects, features and options described in view of the systems apply equally to the methods and computer-readable storage medium, and vice versa. It will also be clear that any one or more of the above variations, aspects, features and options can be combined.

BRIEF DESCRIPTION OF THE FIGURES

The patent or application file contains at least one figure executed in color. Copies of this patent or patent application with color figure(s) will be provided by the Office upon request and payment of the necessary fee.

Features will become apparent to those of ordinary skill in the art by describing in detail exemplary aspects with reference to the attached figures in which.

DETAILED DESCRIPTION

Reference will now be made in detail to implementations and aspects of various examples and variations of systems and methods described herein. Although several exemplary variations of the systems and methods are described herein, other variations of the systems and methods may include aspects of the systems and methods described herein combined in any suitable manner having combinations of all or some of the aspects described.

Figure 1:
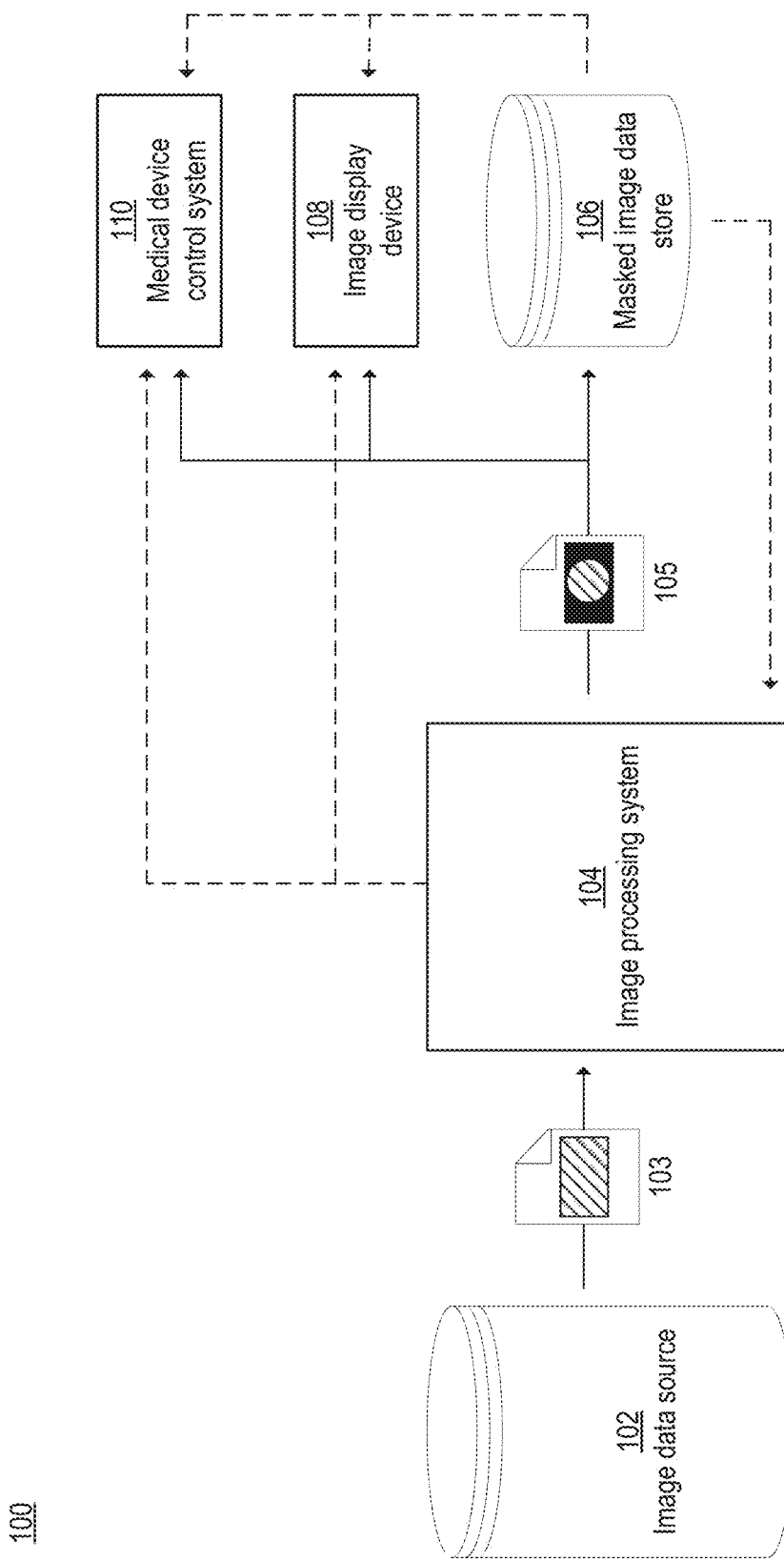
FIG. 1 depicts a system for masking endoscopic images, in accordance with some aspects.

FIG. 1 illustrates an example of a system 100 for masking an endoscopic image. As explained herein, system 100 may be configured to apply one or more techniques for masking endoscopic images and/or for applying further image processing techniques to (and/or otherwise leveraging) masked endoscopic images. Images processed by system 100 may be provided as part of a digital image stream (e.g., a video feed) and processed images generated by system 100 may be output as part of a digital image stream (e.g., a video feed).

As shown, system 100 may include input image data source 102, image processing system 104, masked image data store 106, image display device 108, and medical device control system 110. As explained herein, image processing system 104 may receive an input (e.g., unmasked) digital image 103 from image data source 102 and may apply one or more image processing techniques, including one or more image masking techniques as disclosed herein, to input digital image 103 in order to generate output masked image 105. Output masked image 105 may be stored (e.g., on masked image data store 106), transmitted, visualized (e.g., via image display device 108), displayed (e.g., via image display device 108), and/or used to trigger an automated action by a system, such as an automated action by a medical device or a surgical system (e.g., a device/system controlled by medical device control system 110).

In the example of FIG. 1, image processing system 104 is communicatively coupled (e.g., via one or more wired and/or wireless network communication medium) to input image data source 102, such that image processing system 104 may receive input image data 103 from input image data source 102 via one or more suitable electronic (e.g., network) communication protocols. Optionally, input image data 103 may be transmitted with any suitable associated metadata. In some aspects, input image data source 102 may include any electronic source for medical or surgical images and/or video, such as an image-capture and/or video-capture endoscope, one or more servers, and/or one or more databases or repositories. Optionally, input image data source 102 may be located locally to image processing system 104 (e.g., in the same building, in the same surgical suite, as part of the same local area network, and/or as part of the same computing device (e.g., configured for communication via bus). Optionally, input image data source 102 may be located remotely from image processing system 104 (e.g., configured for communication with image processing system 104 via network communication over a wide-area network).

Image processing system 104 may be configured to receive image data from input image data source 102 and process the image to generate output image data comprising an image in which one or more portions of the image (e.g., inactive portions of the image or low-information portions of the image) are masked. Determination of which areas to mask may be made based on detection of contours in the input image. Image processing system 104 may be configured to mask an image in accordance with the techniques described below with reference to FIG. 2.

Image processing system 104 may be configured to produce masked image data 105. Masked image data 105 may be stored, transmitted, visualized, displayed or used to trigger an automated action by a system, such as an automated action by a medical device or a surgical system, undertaken automatically in accordance with a processor determining that the masked image satisfies one or more criteria.

As shown in FIG. 1, image processing system 104 may be communicatively coupled (e.g., via one or more wired and/or wireless network communication medium) to masked image data store 106, such that image processing system 104 may transmit masked image data 105 (generated based on input image data 103 as explained herein) to masked image data store 106 via one or more suitable electronic (e.g., network) communication protocols. Optionally, masked image data 105 may be transmitted with any suitable associated metadata. In some aspects, masked image data store 106 may include any computer storage for medical or surgical images and/or video, such as one or more databases or repositories. Optionally, masked image data store 106 may be located locally to image processing system 104 (e.g., in the same building, in the same surgical suite, as part of the same local area network, and/or as part of the same computing device (e.g., configured for communication via bus). Optionally, masked image data store 106 may be located remotely from image processing system 104 (e.g., configured for communication with image processing system 104 via network communication over a wide-area network).

Optionally, masked image data store 106 may be configured to transmit data to image processing system 104, as represented by the dashed arrow in FIG. 1 from masked image data store 106 to image processing system 104. Masked image data store 106, may, optionally, be configured to transmit masked image data 105 (optionally along with any associated metadata) and/or any other suitable image data (optionally along with any associated metadata) to image processing system 104. Image data transmitted from masked image data store 106 to image processing system 104 may be used by image processing system 104 for one or more image processing operations, for example for additional image processing operation that may be applied to masked image data 105 after the one or more masking operations have been applied to generate masked image data 105.

As shown in FIG. 1, image processing system 104 may be communicatively coupled (e.g., via one or more wired and/or wireless network communication medium) to image display device 108, such that image processing system 104 may transmit masked image data 105 to masked image display device 108 via one or more suitable electronic (e.g., network) communication protocols. Image display device 108 may include any one or more devices configured to generate and/or display an image represented by image data and/or a visualization generated based on said image. In some aspects, image display device 108 may include a display of a computer or mobile electronic device.

Optionally, image display device 108 may be configured to receive image data (e.g., masked image data 105) from masked image data store 106, as shown by the dashed arrow in FIG. 1 from masked image data store 106 to image display device 108.

Optionally, image display device 108 may be configured to receive (and display) image data aside from masked image data 105 from image processing system 104, as shown by the dashed arrow in FIG. 1 from image processing system 104 to image display device 108.

As shown in FIG. 1, image processing system 104 may be communicatively coupled (e.g., via one or more wired and/or wireless network communication medium) to medical device control system 110, such that image processing system 104 may transmit masked image data 105 to medical device control system 110 via one or more suitable electronic (e.g., network) communication protocols. Medical device control system 110 may include one or more processors configured to control functionality of one or more medical/surgical devices/systems. Medical device control system 110 may be configured to control functionality of a device/system in accordance with one or more characteristics of image data received by control system 110. For example, medical device control system 110 may determine whether received image data meets one or more predetermined and/or dynamically determined criteria (e.g., thresholds) and may accordingly activate, inactivate, configure, or otherwise control functionality of a medical device. In this manner, system 100 may automatically control functionality of a medical device/system based on a surgical video feed as processed by image processing system 104 in order to generate masked image 105.

Optionally, medical device control system 110 may be configured to receive image data (e.g., masked image data 105) from masked image data store 106, as shown by the dashed arrow in FIG. 1 from masked image data store 106 to medical device control system 110.

Optionally, medical device control system 110 may be configured to receive (and leverage) image data aside from masked image data 105 from image processing system 104, as shown by the dashed arrow in FIG. 1 from image processing system 104 to medical device control system 110.

In some aspects, image processing system 104 may comprise any device or system comprising one or more computer processors configured to receive image data, process the received image data, and generate and transmit image data in accordance with the results of the image processing. In some aspects, image processing system 104 may be provided, in whole or in part, as all or part of a desktop computing device, laptop, tablet, mobile electronic device, dedicated medical image processing system, computing module, processor, server, cloud computing system, distributed computing system, or the like.

Figure 2:
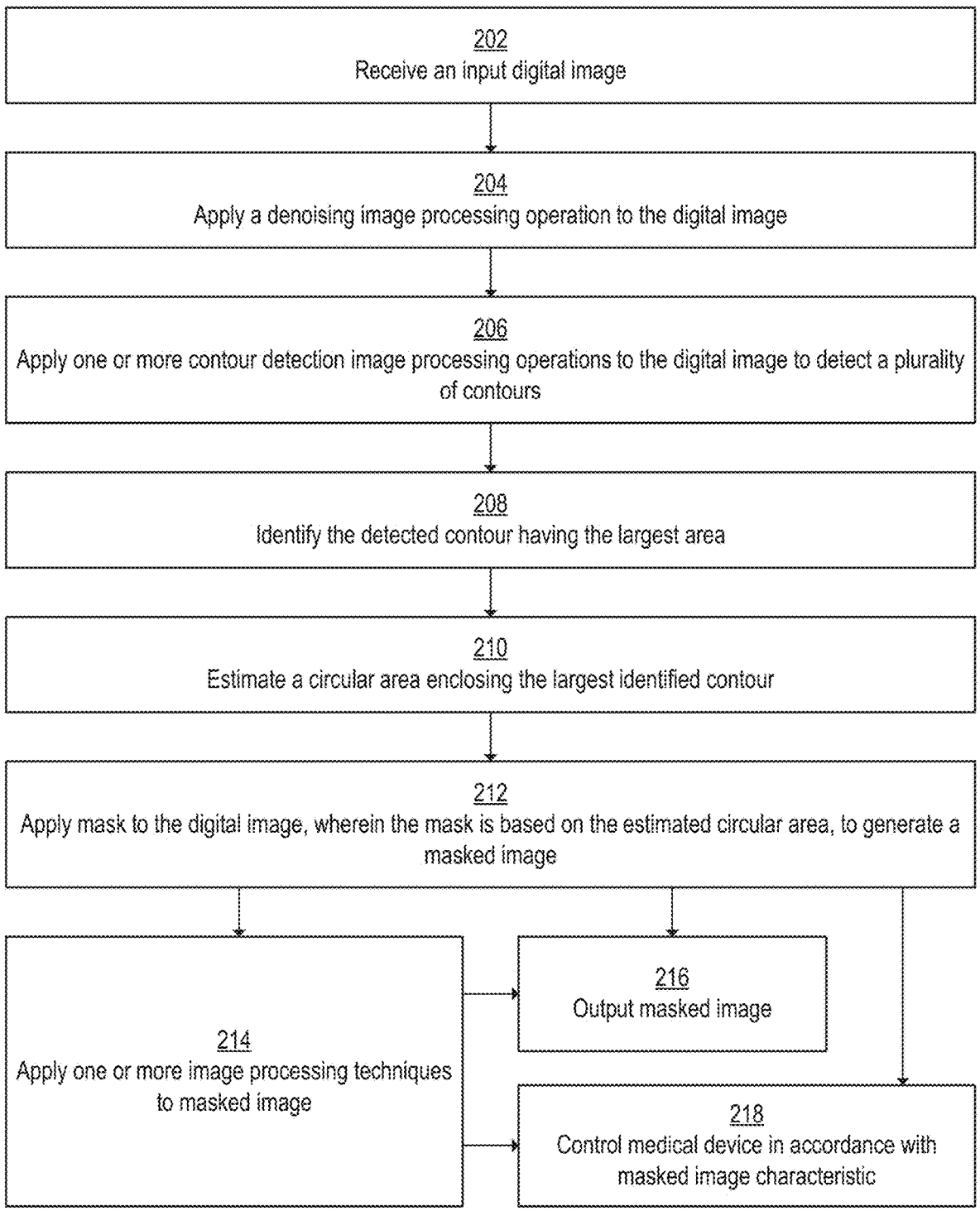
FIG. 2 is a flowchart representing a method for masking endoscopic images, in accordance with some aspects.

FIG. 2 is a flowchart representing an example of a method 200 for masking endoscopic images. As described below in detail, method 200 may enable an image processing system (or any one or more components thereof), such as system 100, to receive an input image and apply a mask to the received image, thereby generating a masked image and, as described herein, obviating the need for further processing of inactive image areas.

Method 200 may be carried out, in whole or in part, by one or more of the components of a system for masking an endoscopic image, such as system 100 described above with respect to FIG. 1. Any one or more of the aspects of method 200 may be combined, in whole or in part, with any one or more of the aspects of FIG. 1, and/or with any one or more of the systems, methods, and/or techniques described elsewhere herein.

At block 202 the system may receive an input digital image captured by an endoscope. In the example of system 100, image processing system 104 may receive input image data from input image data source 102.

Image data received by the system may be in the form of a still image and/or may be received in the form of one or more frames of a video feed. Images received in the form of a sequence of frames of a video image may be processed on a frame-by-frame basis. The image data may be received from any electronic source for medical or surgical images and/or video, such as an image-capture and/or video-capture endoscope, one or more servers, and/or one or more databases or repositories. The method 200 may exclude a step of inserting the endoscope into a body of a patient. The endoscope may be pre-inserted into the body lumen. The image data may be received via any suitable form of electronic communication, including wired and/or wireless network communication. In some aspects, images received may include RGB three-color-channel images.

Image data may be received by the system in association with any suitable metadata indicating image characteristics and/or characteristics regarding a source of the image data. In some aspects, the system may receive image data and metadata separately and may thereafter associate them with one another. In some aspects, metadata may be used in any one or more of the processing operations described herein (e.g., to process the received image data and/or to determine whether the image data meets one or more criteria).

At block 204, the system may apply one or more denoising operations to the image, such that excess noise is removed or reduced in the image data. In some aspects, applying one or more denoising operations before applying one or more of the subsequent steps described below may increase the accuracy and efficiency of the methods described herein.

At block 206, the system may apply one or more contour detection operations to the image (e.g., the denoised image) to identify a plurality of contours in the image. Optionally a single contour detection operation may detect a single contour. Optionally, a single contour detection operation may detect a plurality of contours. Optionally, a contour detection operation may detect one or more contours for a respective color channel (e.g., each of the three RGB color channels).

At block 208, the system may select a contour having the largest area from the plurality of contours identified by the one or more contour detection algorithms 206. To select the contour having the largest area, the system may quantify, e.g. by counting pixels, the contiguous area within each contour, and may then selecting the contour with the largest quantified area (e.g., the highest number of pixels). Optionally, the system may select from amongst all contours detected by the system at block 206. Optionally, the system may select from a subset of the contours detected by the system at block 206, for example after applying one or more filtering criteria to the entire set of contours detected at block 206. Optionally, the subset may be selected to include only contours associated with a confidence value exceeding a threshold. Optionally, the subset may be selected to include only contours detected by a subset of the contour detection operations applied. Optionally, the subset may be selected to include only contours associated with a set of one or more specific color channels.

At block 210, the system may estimate a circular area enclosing the contour having the largest area 208. Estimating the circular area enclosing the contour having the largest area may effectively estimate an active image area of the image data.

Optionally, the circular area estimated may be the smallest possible circular area enclosing the selected contour. Optionally, the circular area estimated may be the smallest possible circular area enclosing the selected contour and a margin area around the contour; for example, the margin area may be an annular area that is a predetermined or dynamically determined number of pixels (or percentage of pixels) in width. The margin area (which may be annular in shape) may be referred to as a circular area margin.

Optionally, a different enclosure shape, aside from a circle, may be used; for example, the system may estimate an oval-shaped area, rectangular area, square area, or area of any other suitable shape that encloses the selected contour.

At block 212, in some aspects, the system may apply a mask to the image based on the circular area (or area of another enclosure shape) enclosing the selected contour. Doing so may cause inactive areas in the image to be masked. Masking inactive image areas may decrease resources required for subsequent storage, transmission, display, visualization, and/or processing (e.g., zooming, centering, focusing operations) of the image data.

The masked image may be stored, transmitted, visualized, displayed or used to trigger an automated action by a system, such as an automated action by a medical device or a surgical system, undertaken automatically in accordance with a processor determining that the masked image satisfies one or more criteria. Optionally, the masked image may undergo further processing, including zooming, centering, or focusing operations.

At block 214, the system may perform further processing on the masked image. Further processing techniques include, but are not limited to, zoom operations, centering operations, or focusing operations (e.g., a localized focus operation).

The system may apply one or more algorithms to determine if a zoom operation should be applied to the masked image. For example, the system may determine a marginal distance between an edge of the masked image (e.g., an edge of the circular area identified) and an edge of the input image (e.g., an edge of a rectangular frame of the input image). The marginal distance may be a smallest marginal distance, e.g., the closest distance to which the masked image comes to the edge of the input image. The marginal distance may be a largest marginal distance, e.g., the farthest distance from which the masked image comes to the edge of the input image (e.g., along a shortest path therebetween). The system may then determine whether the determined marginal distance is greater than a predetermined (or dynamically determined) minimum distance. Optionally, the minimum distance may be configurable, for example by being based in whole or in part on one or more user inputs.

A zoom-in operation may be applied to the masked image in accordance with a determination that the marginal distance is greater than the predetermined minimum distance described above. The zoom-in operation may provide an enhanced view of the surgical site for users.

A zoom-out operation may be applied, for example to ensure that the masked image retains a predetermined required margin between the edge of the masked image and the edge of the input image frame, and/or to ensure that the masked image is the same size as a predetermined or dynamically determined image size.

A localized focus operation may be applied to the masked image, such that focus on a desired portion of the image (e.g., the unmasked portion or a subset of the unmasked portion) is enhanced. The system may e.g. determine whether a localized focus operation should be applied, for example by analyzing the input image and/or the masked image to determine whether one or more criteria for applying a localized focus operation are met. The system may use an algorithm (e.g., a machine learning model) to automatically detect anatomy of interest (e.g., anatomy particularly relevant to the current surgical procedure or specialty) within the masked image in order to identify the desired portion of the image corresponding to the anatomy of interest.

A centering operation may be applied to the masked image, such that a desired portion of the image is centered in the active image area. The system may e.g. determine whether a centering operation should be applied, for example by analyzing the input image and/or the masked image to determine whether one or more criteria for applying a centering operation are met. Optionally, the system may apply a centering operation if a center of the masked image does not align with a center of the input image frame.

At block 216, the system may output the masked image, for example by transmitting the masked image, displaying the masked image, and/or generating one or more visualizations based on the masked image. As shown in FIG. 2, the masked image may be output with and/or without further processing techniques being applied to the masked image at block 216. In the example of system 100, masked image 105 may be output by image display device 108.

At block 218, the system may control a medical device/system in accordance with one or more characteristics of the masked image. For example, the system may determine whether one or more criteria are met by the masked image and may adjust one or more settings or operational modes of a medical/surgical device/system in accordance with said determination. Controlling a medical device in this manner using the masked image data may enable real-time control of medical devices based on processing an incoming endoscopic video feed and using the results of said processing, including the masking techniques described herein, to efficiently and effectively dynamically control medical devices (including, optionally, an image/video capture system used to capture the video feed itself). As shown in FIG. 2, control of a medical device may be performed based on the masked image data with and/or without further processing techniques being applied to the masked image at block 216. As block 218 is optional, the step of controlling a medical device/system in accordance with one or more characteristics of the masked image may be omitted.

Figure 3C:
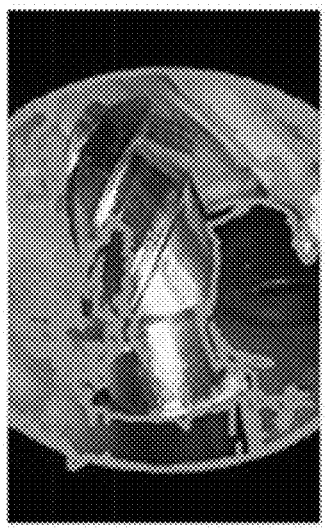
FIGS. 3A-3E show a first example set of endoscopic images depicting a sequence of steps in an image masking process, in accordance with some aspects.
Figure 3B:
Figure 3A:
Figure 3E:
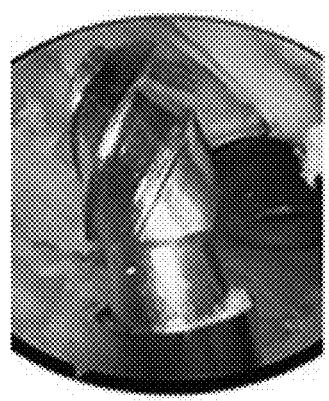
Figure 3D:
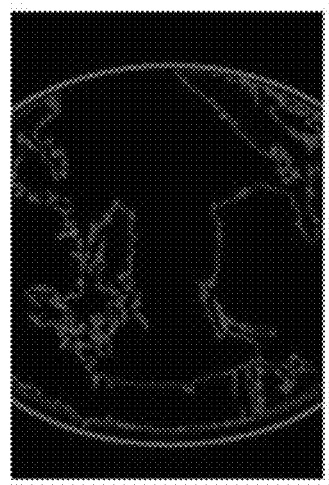

FIGS. 3A-3E show a first example set of endoscopic images depicting a sequence of steps in an image masking process, in accordance with some aspects. FIG. 3A shows an original input image captured by an endoscope (e.g., corresponding to input image data 103 in FIG. 1). FIG. 3B shows the input image after one or more denoising algorithms and one or more contour detection algorithms have been applied in order to detect a plurality of contours. FIG. 3C shows the image after the contour with the largest area has been identified. FIG. 3D shows the image after the smallest circular area enclosing the largest contour found in FIG. 3C has been identified (in the example shown in FIG. 3D, the smallest circular area is a truncated circular area, truncated at the edges of the frame, rather than a complete circular area), with a thin line denoting the boundary of the circular area. FIG. 3E shows a masked image (e.g., corresponding to masked image data 105 in FIG. 1) generated by applying a mask based on the determined circular area, thereby masking inactive image areas surrounding the determined circular area.

Figure 4A:
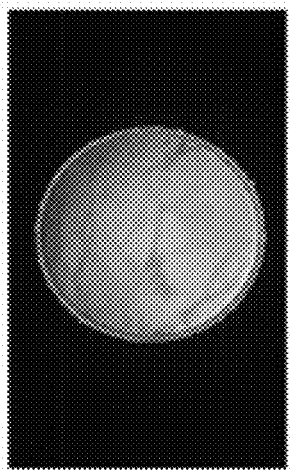
FIGS. 4A-4F show a second example set of endoscopic images depicting a sequence of steps in an image masking and zoom-in process, in accordance with some aspects.
Figure 4B:
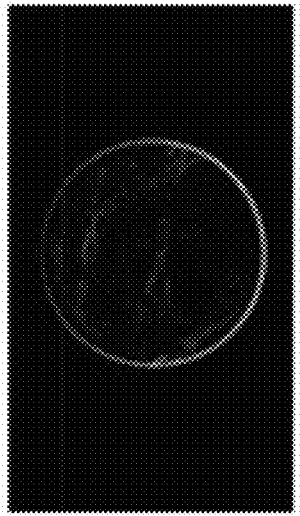
Figure 4C:
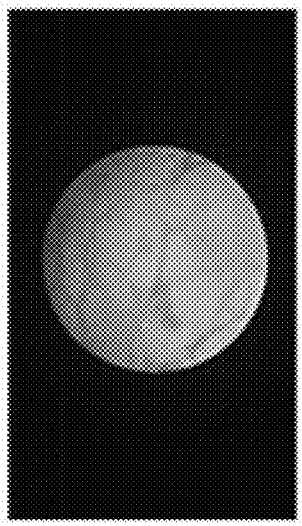
Figure 4D:
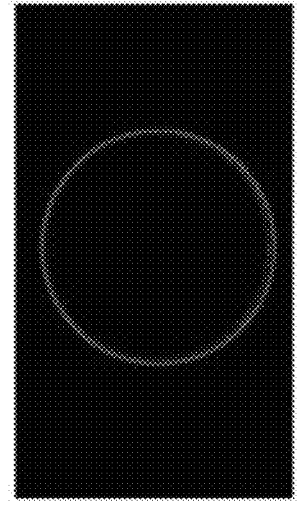
Figure 4E:
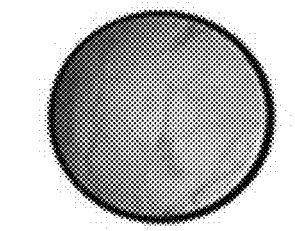
Figure 4F:
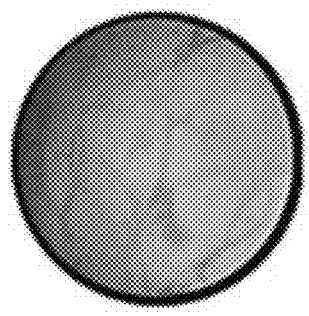

FIGS. 4A-4F show a second example set of endoscopic images depicting a sequence of steps in an image masking and zoom-in process, in accordance with some aspects. FIG. 4A shows an original input image captured by an endoscope (e.g., corresponding to input image data 103 in FIG. 1). FIG. 4B shows the input image after one or more denoising algorithms and one or more contour detection algorithms have been applied in order to detect a plurality of contours. FIG. 4C shows the image after the contour with the largest area has been identified. FIG. 4D shows the image after the smallest circular area enclosing the largest contour found in FIG. 4C has been identified (in the example shown in FIG. 4D, the smallest circular area is a complete circular area within the edges of the frame), with a thin line denoting the boundary of the circular area. FIG. 4E shows a masked image (e.g., corresponding to masked image data 105 in FIG. 1) generated by applying a mask based on the determined circular area, thereby masking inactive image areas. FIG. 4F shows the masked image after a zoom-in operation has been performed on the masked image, enlarging the active area of the image retained in the masked image shown in FIG. 4E to fill the full vertical space available in the input image frame size. In some variations, the zoom-in operation may alternatively enlarge the active area of the image retained in the masked image to fill a predetermined space available (e.g., a space corresponding to the active area for a larger endoscope size), which may be less than the full vertical space available in the input image frame size.

Figure 5:
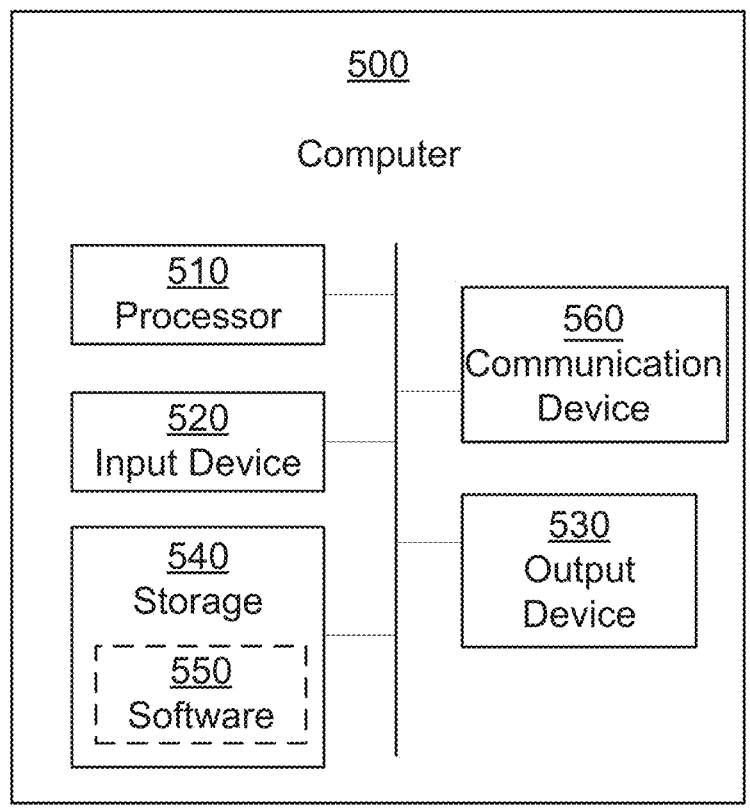
FIG. 5 depicts a computer, in accordance with some aspects.

FIG. 5 illustrates an example of a computer. Computer 500 can be a component of an image processing system according to the systems and methods described above, such as system 100 of FIG. 1. In some aspects, computer 500 may execute a method for masking an endoscopic image, for example by identifying contours in an input digital image and identifying the contour having the largest area, estimating the smallest circular area enclosing the largest contour area, and applying a mask to the image based on the circular area.

Computer 500 can be a host computer connected to a network. Computer 500 can be a client computer or a server. As shown in FIG. 5, computer 500 can be any suitable type of microprocessor-based device, such as a personal computer, workstation, server, or handheld computing device, such as a phone or tablet. The computer can include, for example, one or more of processor 510, input device 520, output device 530, storage 540, and communication device 560. Input device 520 and output device 530 can correspond to those described above and can either be connectable or integrated with the computer.

Input device 520 can be any suitable device that provides input, such as a touch screen or monitor, keyboard, mouse, or voice-recognition device. Output device 530 can be any suitable device that provides an output, such as a touch screen, monitor, printer, disk drive, or speaker.

Storage 540 can be any suitable device that provides storage, such as an electrical, magnetic, or optical memory, including a random access memory (RAM), cache, hard drive, CD-ROM drive, tape drive, or removable storage disk. Communication device 560 can include any suitable device capable of transmitting and receiving signals over a network, such as a network interface chip or card. The components of the computer can be connected in any suitable manner, such as via a physical bus or wirelessly. Storage 540 can be a non-transitory computer-readable storage medium comprising one or more programs, which, when executed by one or more processors, such as processor 510, cause the one or more processors to execute methods described herein.

Software 550, which can be stored in storage 540 and executed by processor 510, can include, for example, the programming that embodies the functionality of the present disclosure (e.g., as embodied in the systems, computers, servers, and/or devices as described above). In some aspects, software 550 can include a combination of servers such as application servers and database servers.

Software 550 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 500 can implement any operating system suitable for operating on the network. Software 550 can be written in any suitable programming language, such as C, C++, Java, or Python. In various aspects, application software embodying the functionality of the present disclosure can be deployed in different configurations, such as in a client/server arrangement or through a Web browser as a Web-based application or Web service, for example.

For the purpose of clarity and a concise description, features are described herein as part of the same or separate aspects; however, it will be appreciated that the scope of the disclosure includes aspects having combinations of all or some of the features described.

The invention claimed is:

1. A system for masking endoscopic images, the system comprising one or more processors configured to:
   receive an input digital image;
   apply one or more contour detection algorithms to the digital image to detect a plurality of contours in the digital image;
   identify, among the plurality of contours, a contour having the largest area;
   estimate a circular area of the image enclosing the contour; and
   generate a masked digital image by applying a mask to the input digital image, wherein the mask is based on the estimated circular area.

2. The system of claim 1, wherein the one or more processors are configured to apply one or more denoising algorithms to the input digital image before applying the one or more contour detections.

3. The system of claim 1, wherein the circular area is a smallest circular area enclosing the contour.

4. The system of claim 1, wherein the circular area is a smallest circular area enclosing the combination of the contour and a circular area margin of a predetermined circular area margin size.

5. The system of claim 4, wherein the predetermined circular area margin size is set in accordance with a user input.

6. The system of claim 1, wherein one or more of the contour detection algorithms is a color-channel-specific contour detection algorithm.

7. The system of claim 1, wherein the one or more processors are configured to perform one or more image processing techniques on the masked digital image.

8. The system of claim 7, wherein the one or more image processing techniques include one or more selected from: a zoom operation, a centering operation, and a localized focus operation.

9. The system of claim 1, wherein the one or more processors are configured to:
   determine a marginal distance between an edge of the masked image and an edge of the input image;
   determine whether the marginal distance is greater than a predetermined minimum distance; and
   in accordance with a determination that the marginal distance is greater than the predetermined minimum distance, apply a zoom-in operation to the masked image.

10. The system of claim 1, wherein the input digital image is a frame in an input image sequence.

11. The system of claim 1, wherein the masked digital image is a frame in an output image sequence.

12. A non-transitory computer-readable storage medium storing instructions for masking endoscopic images, the instructions configured to be executed by one or more processors of a system to cause the system to:
   receive an input digital image;
   apply one or more contour detection algorithms to the digital image to detect a plurality of contours in the digital image;

identify, among the plurality of contours, a contour having the largest area;

estimate a circular area of the image enclosing the contour; and generate a masked digital image by applying a mask to the input digital image, wherein the mask is based on the estimated circular area.

13. A method for masking endoscopic images, the method configured to be performed by a system comprising one or more processors, the method comprising:

receiving an input digital image;

applying one or more contour detection algorithms to the digital image to detect a plurality of contours in the digital image;

identifying, among the plurality of contours, a contour having the largest area;

estimating a circular area of the image enclosing the contour; and generating a masked digital image by applying a mask to the input digital image, wherein the mask is based on the estimated circular area.

14. The method of claim 13, comprising applying one or more denoising algorithms to the input digital image before applying the one or more contour detections.

15. The method of claim 13, wherein the circular area is a smallest circular area enclosing the contour.

16. The method of claim 13, wherein the circular area is a smallest circular area enclosing the combination of the contour and a circular area margin of a predetermined circular area margin size.

17. The method of claim 16, wherein the predetermined circular area margin size is set in accordance with a user input.

18. The method of claim 13, wherein one or more of the contour detection algorithms is a color-channel-specific contour detection algorithm.

19. The method of claim 13, comprising performing one or more image processing techniques on the masked digital image.

20. The method of claim 19, wherein the one or more image processing techniques include one or more selected from: a zoom operation, a centering operation, and a localized focus operation.

21. The method of claim 13, comprising:

determining a marginal distance between an edge of the masked image and an edge of the input image;

determining that the marginal distance is greater than a predetermined minimum distance; and in accordance with determining that the marginal distance is greater than the predetermined minimum distance, applying a zoom-in operation to the masked image.

22. The method of claim 13, wherein the input digital image is a frame in an input image sequence.

23. The method of claim 13, wherein the masked digital image is a frame in an output image sequence.

* * * * *